(12) United States Patent
Uchimura et al.

(10) Patent No.: US 11,145,286 B2
(45) Date of Patent: Oct. 12, 2021

(54) ELECTRONIC HORN

(71) Applicant: IMASEN ELECTRIC INDUSTRIAL CO., LTD., Inuyama (JP)

(72) Inventors: Katsunori Uchimura, Nagoya (JP); Koichi Toyama, Nagoya (JP); Yoshio Miyata, Nagoya (JP); Tetsuo Momo, Nagoya (JP); Toshihiko Kawamura, Nagoya (JP); Junjiro Yoshimura, Nagoya (JP)

(73) Assignee: IMASEN ELECTRIC INDUSTRIAL CO., LTD., Inuyama (JP)

( * ) Notice: Subject to any disclaimer, the term of this patent is extended or adjusted under 35 U.S.C. 154(b) by 238 days.

(21) Appl. No.: 16/488,092

(22) PCT Filed: Feb. 23, 2018

(86) PCT No.: PCT/JP2018/006702
§ 371 (c)(1),
(2) Date: Aug. 22, 2019

(87) PCT Pub. No.: WO2018/159490
PCT Pub. Date: Sep. 7, 2018

(65) Prior Publication Data
US 2020/0066243 A1 Feb. 27, 2020

(30) Foreign Application Priority Data
Mar. 1, 2017 (JP) .............................. JP2017-037879

(51) Int. Cl.
*G10K 9/122* (2006.01)
*B60Q 5/00* (2006.01)

(52) U.S. Cl.
CPC ................ *G10K 9/122* (2013.01); *B60Q 5/00* (2013.01)

(58) Field of Classification Search
CPC ................................. G10K 9/122; B60Q 5/00
(Continued)

(56) References Cited

U.S. PATENT DOCUMENTS

| 1,904,759 A | * | 4/1933 | Hueber | .................... G10K 9/04 116/138 |
| 5,012,221 A | | 4/1991 | Neuhaus et al. | |

(Continued)

FOREIGN PATENT DOCUMENTS

| CN | 101079173 A | 11/2007 |
| GB | 2354903 A | 4/2001 |

(Continued)

OTHER PUBLICATIONS

Unpublished U.S. Appl. No. 16/761,999.
(Continued)

*Primary Examiner* — Kerri L McNally
(74) *Attorney, Agent, or Firm* — J-TEK Law PLLC; Jeffrey D. Tekanic; Scott T. Wakeman

(57) ABSTRACT

An electronic horn includes a cover (8) on a front side of an intermediate element (6). A first passage (P1) within the horn is defined by a central portion (82) of the cover (8) that projects into a cylindrical interior of a cylindrical waterproofing wall (621). Second passages (P2, P3, P4) extend generally concentrically with respect to the first passage (P1) and are respectively defined by water-proofing walls (83, 84) that are formed on the cover (8) and project into the interior spaces of water-proofing walls (622, 633). The outermost second passage (P4) opens toward the forward direction. The first and second passages (P1-P4) extend in a back-and-forth path that prevents any rainwater, which has entered the interior of the horn through the opening of the outermost
(Continued)

second passage (P4), from reaching a resonance space (7) defined between the resonator (7) and a sound-generating oscillator (51).

20 Claims, 2 Drawing Sheets

(58) Field of Classification Search
USPC .......................................................... 181/149
See application file for complete search history.

(56) References Cited

U.S. PATENT DOCUMENTS

| | | | |
|---|---|---|---|
| 5,293,149 A | | 3/1994 | Wilson et al. |
| 8,598,997 B2 | | 12/2013 | Hayashi et al. |
| 9,950,663 B2 | | 4/2018 | Toyama et al. |
| 2003/0228021 A1 | | 12/2003 | Letinturier et al. |
| 2007/0057778 A1* | | 3/2007 | Prince, Jr. ............... G08B 3/10 340/384.6 |
| 2008/0180230 A1 | | 7/2008 | Zimmermann |
| 2010/0119096 A1* | | 5/2010 | Suzuki .................... G10K 9/20 381/340 |
| 2012/0182137 A1* | | 7/2012 | Nakayama .............. G10K 9/13 340/425.5 |
| 2013/0093578 A1 | | 4/2013 | Goto |
| 2017/0028910 A1 | | 2/2017 | Toyama et al. |

FOREIGN PATENT DOCUMENTS

| | | |
|---|---|---|
| JP | S5547007 U | 3/1980 |
| JP | S5713490 A | 1/1982 |
| JP | S58162994 A | 9/1983 |
| JP | H0255297 U | 4/1990 |
| JP | H04119497 U | 10/1992 |
| JP | H0678998 U | 11/1994 |
| JP | H07222284 A | 8/1995 |
| JP | H10207466 A | 8/1998 |
| JP | 2007316450 A | 12/2007 |
| JP | 2012148657 A | 8/2012 |
| WO | 2015145659 A1 | 10/2015 |
| WO | 2015167572 A1 | 11/2015 |
| WO | 2015186239 A1 | 12/2015 |
| WO | 2019092828 A1 | 5/2019 |

OTHER PUBLICATIONS

English translation of the International Search Report dated Jun. 19, 2018 for parent application No. PCT/JP2018/006702.

English translation of the Written Opinion of the International Searching Authority for parent application No. PCT/JP2018/006702.

* cited by examiner

ELECTRONIC HORN

The present application is the U.S. national stage of International application serial no. PCT/JP2018/006702 filed on Feb. 23, 2018, which claims priority to Japanese patent application serial number 2017-037879 filed on Mar. 1, 2017.

TECHNICAL FIELD

The present invention generally relates to an electronic horn, and in certain embodiments, it relates to a structural improvement of an electronic horn that can effectively prevent the ingress of rainwater into a resonance space.

BACKGROUND ART

Because an electronic horn emits a warning sound (including a vehicle approaching sound) by causing a piezo-electric element to excite a plate-like oscillator, it is characterized by its compactness, longevity, etc. as compared to conventional electromagnetic horns. However, if rainwater penetrates into the interior of a horn mounted on a vehicle, excitation of the oscillator by the piezoelectric element may be impaired, thereby changing the sound emitting frequency or even creating the risk that sound will not be emitted.

Thus, for example, in Japanese Laid-Open Patent Publication No. 2012-148657, an ultrasonic-transmissive, waterproof sheet is provided so as to cover the opening of a horn such that the ultrasonic waves can be output to the exterior of the horn while preventing the ingress of rainwater.

SUMMARY OF THE INVENTION

However, if a water-proof sheet is utilized in a horn that outputs an audible sound instead of an ultrasonic wave, the water-proof sheet will attenuate the audible warning sound, thereby negatively affecting the performance of the horn.

Therefore, it is one non-limiting object of the present teachings to disclose an electronic horn that can effectively prevent the ingress of rainwater, e.g., without the use of a water-proof sheet or the like.

In a first aspect of the present disclosure, an electronic horn, e.g., for a vehicle, includes: a plate-like oscillator (51), a piezoelectric element (52) that excites the oscillator (51), a resonator (7) provided with an opening (71) in a portion thereof, the resonator (7) covering forward of the oscillator (51) such that a resonance space (S) is defined between the resonator (7) and the oscillator (51), a buffer chamber (BR) that communicates with the resonator space (S) via the opening (71), a first passage (P1) inversely curving from the buffer chamber (BR) to the rear and radially outwardly, and at least one second passage (P2, P3, P4) that follows the first passage and inversely curves towards to the front or the rear and radially outwardly, wherein an outermost second passage (P4) opens in the forward direction, a forward-opening cylindrical intermediate element (6) is provided forward of the resonator (7), a cover (8) covers a front side of the intermediate element (6), the first passage (P1) is formed, in part, by a central portion (82) of the cover (8) that projects into a cylindrical interior of a cylindrical water-proofing wall (621) within the intermediate element (6), and the second passage(s) (P2, P3, P4) is (are) formed concentrically with respect to the opening (71) of the resonator (7) by one or more water-proofing walls (83, 84) formed on the cover (8), which wall(s) project(s) (or respectively project) into a cylindrical interior or interiors of another water-proofing wall or other water-proofing walls (622, 633) of or located within the intermediate element (6).

In the first aspect, even if rainwater penetrates into the horn through an opening of the outermost, forward-opening second passage, the rainwater encounters a plurality of inversely curved (meandering) passages formed by the central portion of the cover and the water-proofing wall(s) that extend from the second passage to the first passage toward the buffer chamber at the center of the horn.

Therefore, such rainwater never directly enters the buffer chamber with momentum, thereby effectively preventing rainwater from entering the interior of the resonator space through the opening in the resonator.

In a second aspect, a louver (81) is provided in or on the opening of the outermost second passage (P4).

According to the second aspect, most of the rainwater directed toward the opening of the outermost, forward-opening second passage hits the blades of the louver, which prevents (blocks) such rainwater from entering into the outermost second passage.

In a third aspect, a drain hole (632) is provided at a lowermost position of the horn proximate to the opening of the outermost second passage (P4).

According to the third aspect, rainwater that has dropped by its own weight along the central portion of the cover and/or along the water-proofing wall(s) is efficiently drained from the drain hole to the exterior of the horn.

The reference numerals in parentheses above show a representative, non-limiting correspondence relationship with specific structures described in the below described embodiment.

As described above, in electronic horns of the present disclosure, it is possible to effectively prevent the ingress of rainwater, e.g., without using a water-proof sheet or the like to cover the sound output opening of the electronic horn.

DETAILED DESCRIPTION OF THE INVENTION

It is noted that the embodiment, which will be described below, is merely an example of the present disclosure and various design improvements implemented by those skilled in the art without departing from the spirit and scope of the present invention are also included in the scope of the present invention.

Figure 1:
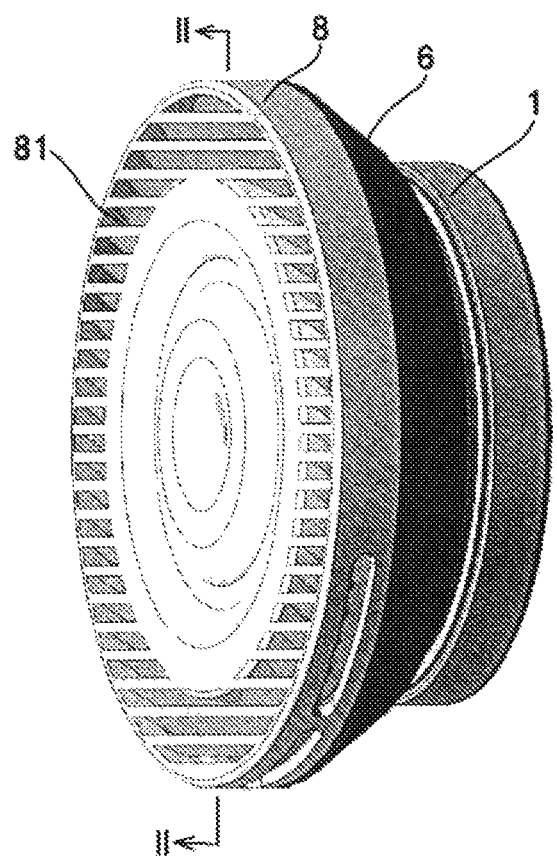
FIG. 1 is an overall perspective view of an electronic horn according to one embodiment of the present disclosure.

In FIG. 1 the external appearance of an electronic horn is shown. In FIG. 1, the horn is provided with a cylindrical metal casing 1 that opens in a forward/rearward direction (leftward/rightward direction in FIG. 1) when mounted on a vehicle. It is noted that the "forward/rearward direction" does not represent an absolute direction; the direction in which the sound of the horn is emitted, in accordance with the state in which the horn is installed, is assumed to be the forward direction. A resin intermediate element 6, whose diameter gradually widens forwardly, extends from the casing 1; a cover 8 is fitted in (on) a circular opening thereof. A louver 81 is formed all around the front outermost periphery of the cover 8.

Figure 2:
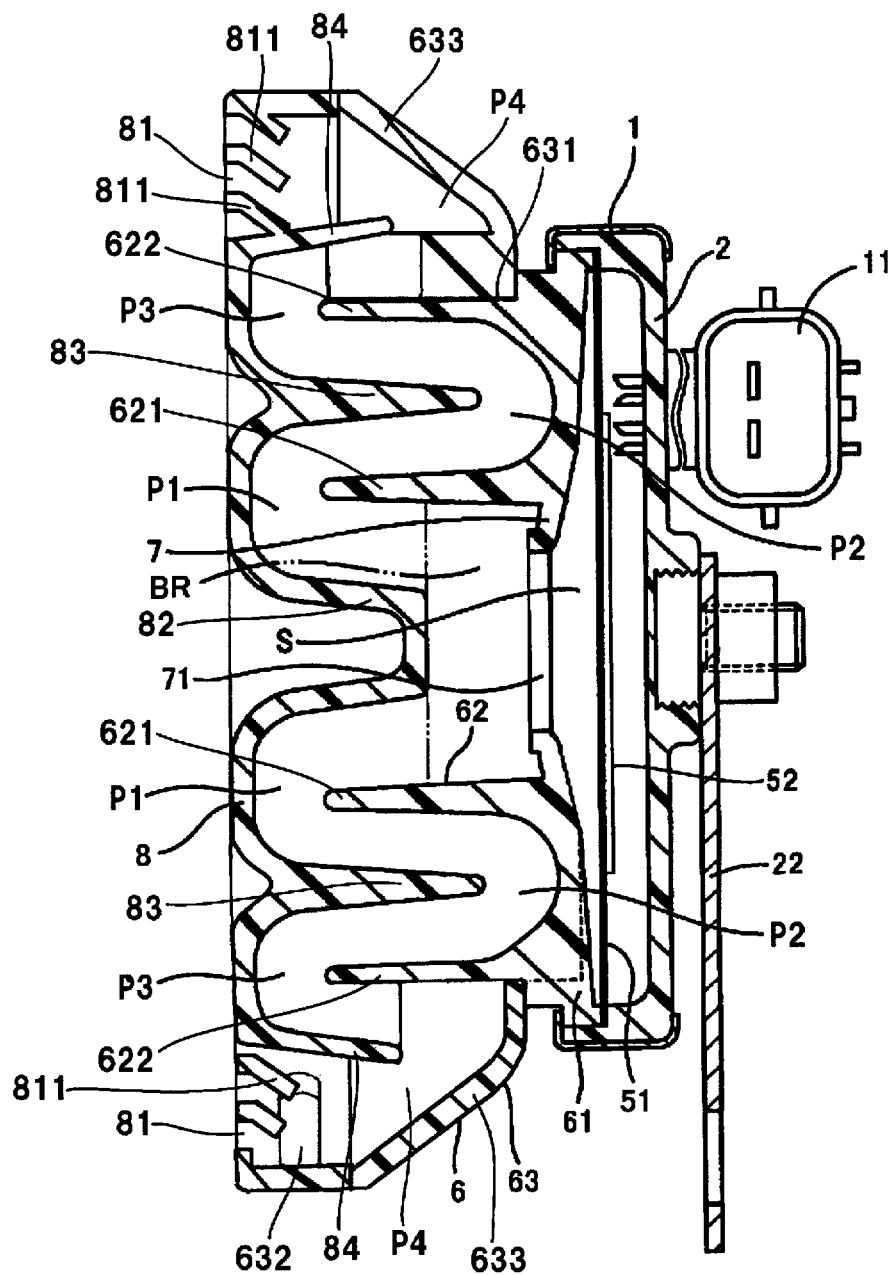
FIG. 2 is a vertical cross-sectional view of the electronic horn along line II-II in FIG. 1.

In FIG. 2 a vertical cross section of the horn along line II-II in FIG. 1 is shown. In FIG. 2, a resin container-shaped, forward-opening holder 2 is held in the cylinder of the casing 1; a circuit substrate (not shown) provided with a warning sound circuit constituted by a warning signal generation circuit, an amplifier circuit and the like is disposed on a bottom wall of the holder 2 parallel thereto. A mounting stay 22 is connected to the outer surface of the bottom wall of the holder 2 by a bolt.

An oscillator 51 made of a metal plate is provided under tension to close the opening of the holder 2; a circular piezoelectric element 52 is adhered to a central portion of the rear surface of the oscillator 51. Output lines (not shown) extend from the circuit substrate to the oscillator 51 respectively leading to two electrodes (not shown) of the piezoelectric element 52. Furthermore, the warning sound circuit on the circuit substrate is connected to a power supply connector 11 provided outside the casing 1. In the present embodiment, the circuit substrate is not provided within the casing 1, and in this embodiment, the power supply connector 11 is connected to an externally-provided circuit substrate.

The above-mentioned intermediate element 6 is equipped with an inner cylinder 62 and an outer conical housing 63. The inner cylinder 62 is shaped like a double container having two cylindrical, forward-opening water-proofing walls 621 and 622, radially inside and outside. The outer peripheral edge 61 of the bottom wall of the inner cylinder 62 is fitted into the opening of the holder 2 while tightly pressing the outer peripheral edges of the oscillator 51 and is affixed here by crimping the open edge of the casing 1. The central portion of the bottom wall, which is located within the water-proofing wall 621 of the inner cylinder 62, is bent so as to protrude into the cylinder in a chevron shape, thereby forming a resonance space S between itself and the oscillator 51 and constituting a resonator 7. A circular opening 71 is formed at the peak of the central portion of the bottom wall that constitutes the resonator 7.

The inner cylinder 62 is surrounded by the outer conical housing 63. The outer conical housing 63 is shaped like a relatively shallow container and an opening 631 of its bottom wall is fitted onto the outer periphery of the water-proofing wall 622 of the inner cylinder 62. An outer peripheral wall (water-proofing wall) 633 of the outer conical housing 63 widens outwardly in the forward direction, thereby constituting a reflector as a whole.

The cover 8 is provided so as to cover the front of the intermediate element 6. The cover 8 has a circular shape of the same diameter as the opening of the outer conical housing 63. A central portion 82 of the cover 8 has a generally cylindrical shape, the closed tip end of which projects into a substantially middle position (space) within the water-proofing wall 621 of the inner cylinder 62. Furthermore, a rearward-protruding, cylindrical water-proofing wall 83 is formed on the cover 8. The tubular end of the cylinder of the water-proofing wall 83 projects into a substantially middle position (space) between the water-proofing walls 621 and 622 of the inner cylinder 62; the water-proofing wall 83 gradually becomes thinner in the direction toward the tubular end of the generally cylindrical wall 83.

A plurality of blades 811, which slope downward toward the rear, are formed at equal intervals in the vertical direction in the louver 81, which is formed around the outermost circumference of the cover 8, as shown in FIG. 2. A generally cylindrical (slightly conical) water-proofing wall 84, which is on the interior side of the louver 81 and protrudes rearward from the rear surface of the cover 8, projects between the water-proofing wall 622 of the inner cylinder 62 and the outer peripheral truncated conical wall (water-proofing wall) 633 of the outer conical housing 63. As viewed from a forward straight-ahead direction, the opening formed in the portion where the louver 81 is installed is closed by the blades 811 of the louver 81 overlapping each other in the vertical direction. A drain hole 632 is formed in an outer circumference of the wall 633 proximate to the louver 81 and is located at the lowermost position of the horn in the installed state.

In the above-described structure, a buffer chamber BR having a predetermined volume (the space delimited by the dot-dash line in FIG. 2), which communicates with the resonance space S through the opening 71, is formed within the electronic horn between the water-proofing wall 621 of the inner cylinder 62 and the cover 8. In addition, a first passage P1, which extends from the buffer chamber BR and inversely curves to the rear and radially outward, is formed by the central portion 82 of the cover 8, which projects into the cylinder interior of the water-proofing wall 621; furthermore, a plurality of second passages P2, P3 are formed following the first passage P1 in the direction toward the outer circumference by the water-proofing wall 83, which projects into the cylinder interior between the water-proofing wall 622 and the water-proofing wall 621. That is, the innermost second passage P2 communicates with (follows) the first passage P1 and inversely curves to the front and radially outward. The intermediate second passage P3 follows the innermost second passage P2 and inversely curves toward the rear and radially outward. In addition, the outermost peripheral second passage P4 is formed by wall 84 and wall 633, follows the intermediate second passage P3 and inversely curves toward the front and radially outward. The second passages P2 to P4 are formed concentrically in the horn with respect to the opening 71 of the resonator 7.

When an output signal of the warning sound circuit is input into the piezoelectric element 52, a sound output is emitted from the oscillator 51. A specific frequency component of this sound output, which is suitable for warning, is amplified in the resonator 7; the amplified warning sound is guided via the opening 71 into the first passage P1, which extends from the buffer chamber BR, is turned radially outward and rearward, and is reflected and outputted outward in the diameter direction and forward via the respective second passages P2 to P4.

The warning sound outputted from the resonator 7 in this way is outputted forwardly in an efficient manner with strong directionality while being resonance amplified owing to the megaphone effect by the first passage P1 and the second passages P2 to P4, which gradually increase in diameter. At this time, the warning sound is directed forwardly through gaps between the blades 811 of the louver 81 without any problem. Since the first passage P1 and the second passages P2 to P4, which exhibit the megaphone effect, are connected in series in the diameter (radial) direction here, the horn has a compact shape (depth) in the forward/rearward direction.

When the electronic horn is pointed in the vehicle forward direction while the vehicle is traveling, rainwater may strike the opening of the outermost second passage P4, which opens in the forward direction. However, because the opening is substantially closed by the blades 811 of the louver 81 as viewed from the forward straight-ahead direction, most of the rainwater will hit the blades 811 and thereby be prevented from entering into the second passage P4. Moreover, even if some rainwater enters the second passage P4, such rainwater will encounter the plurality of inversely curved passages P1 to P4 formed by the cover central portion 82 and the water-proofing walls 621, 622, 83 and 84 in the path from the second passages P3, P2 to the first passage P1 toward the buffer chamber BR at the center of the horn. Owing to this back-and-forth path, the rainwater is prevented from directly entering into the buffer chamber BR with momentum. This effectively prevents the rainwater from entering into the resonance space S via the opening 71 and thus the rainwater does not come into contact with the oscillator 51. It is noted that any rainwater, which has passed through the upper louver 81, will lose its momentum, drop by its own weight along the cover central part 82 and the water-proofing walls 621, 622, 83 and 84, which constitute the passage walls thereof from the upper second passages P4, P3 and P2 to the lower second passages P2, P3 and P4 via the first passage P1, and will ultimately drain through the drain hole 632, which opens at the lowermost position, to the exterior of the horn.

It is noted that, although a plurality of second passages are provided in the above embodiment, only one outermost second passage may be provided.

Reference Symbols List
- 51 . . . oscillator,
- 52 . . . piezoelectric element,
- 6 . . . intermediate element,
- 621, 622, 633 . . . water-proofing walls,
- 632 . . . drain hole,
- 7 . . . resonator,
- 71 . . . opening,
- 8 . . . cover,
- 81 . . . louver,
- 82 . . . cover central portion,
- 83, 84 . . . water-proofing walls,
- BR . . . buffer chamber,
- P1 . . . first passage,
- P2, P3, P4 . . . second passages,
- S . . . resonance space

The invention claimed is:

1. An electronic horn comprising:
a plate-shaped oscillator;
a piezoelectric element configured to excite the oscillator;
a resonator having an opening, the resonator at least partially covering one side of the oscillator and a resonance space being defined between a first side of the resonator and the oscillator;
a buffer chamber that communicates with the resonance space via the opening;
a first passage having a first portion that extends away from the buffer chamber in a first direction and a second portion that inversely curves in a second direction opposite of the first direction and radially outwardly relative to the first portion; and
an odd number of second passage(s) in fluid communication with the first passage, the second passage(s) each including a first portion that and inversely curves in the first direction or in the second direction and radially outwardly relative to the first passage,
wherein:
a radially outermost one of the second passage(s) has an opening to the exterior of the horn, the opening facing toward the first direction,
an intermediate element is provided on a second side of the resonator,
a cover covers a side of the intermediate element that is opposite of the resonator, the first portion of the first passage being defined by a central portion of the cover that projects in the second direction into a cylindrical interior of a first water-proofing wall within the intermediate element, and
the second passage(s) is (are) defined by one or more water-proofing walls formed on the cover and projecting in the second direction, the water-proofing walls(s) of the cover projecting into an interior space or interior spaces defined by one or more second water-proofing walls within or defined by the intermediate element.

2. The electronic horn according to claim 1, further comprising:
a louver provided in or on the opening of the outermost one of the second passage(s).

3. The electronic horn according to claim 2, further comprising:
a drain hole provided at a lowermost position of the horn and proximate to the opening of the outermost one of the second passage(s).

4. An electronic horn comprising:
a plate-shaped oscillator;
a piezoelectric element configured to excite the oscillator;
a resonator having an opening, the resonator at least partially covering one side of the oscillator and a resonance space being defined between a first side of the resonator and the oscillator;
an intermediate element provided on a second side of the resonator;
a first water-proofing wall extending away from the resonator in a first direction and defining a buffer chamber that is in fluid communication with the resonance space via the opening;
at least one second water-proofing wall extending away from the resonator in the first direction;
a cover attached to a side of the intermediate element that is opposite of the resonator in the first direction,
wherein the cover includes:
a central portion that projects in a second direction, which is opposite of the first direction, within a space defined by the first water-proofing wall and toward the opening of the resonator,
a third water-proofing wall extending in the second direction into a space between the first and second water-proofing walls, and
a fourth water-proofing wall extending in the second direction into a space between the radially-outer side of the second water-proofing wall and the intermediate element, and
wherein:
a first portion of a first sound passage is defined by the central portion of the cover and a radially-inward side of the first water-proofing wall and extends from the buffer chamber in the first direction to a portion of the cover that extends perpendicular to the first direction,
a second portion of the first sound passage extends radially outwardly from the first portion of the first sound passage and is curved,
a first portion of a second sound passage extends from the second portion of the first sound passage in the second direction and is defined by a radially-outward side of the first water-proofing wall and a radially-inward side of the third water-proofing wall,
a second portion of the second sound passage extends radially outwardly from the first portion of the second sound passage and is curved,
a first portion of a third sound passage extends from the second portion of the second sound passage in the second direction and is defined by a radially-outward side of the third water-proofing wall and a radially-inward side of the second water-proofing wall, a second portion of the third sound passage extends radially outwardly from the first portion of the third sound passage and is curved, a first portion of a fourth sound passage extends from the second portion of the third sound passage in the second direction and is defined by a radially-outward side of the second water-proofing wall and a radially-inward side of the intermediate element, a second portion of the fourth sound passage extends radially outwardly from the first portion of the fourth sound passage, is curved and contains a portion that connects to the opening of the cover, the first portions of the first, second, third and fourth sound passages are concentric, and the fourth sound passage has an opening to the exterior of the horn, the opening facing toward the first direction and being in fluid communication with an opening in the cover.

5. The electronic horn according to claim 4, wherein the opening in the cover is a louver.

6. The electronic horn according to claim 5, wherein the louver has blades that all slope obliquely to the second direction in the same direction.

7. The electronic horn according to claim 6, wherein a drain hole is defined in the intermediate element proximate to the opening of the fourth sound passage, the drain hole being located in a direction in which the blades of the louver point.

8. The electronic horn according to claim 7, wherein the first water-proofing wall is cylindrical shaped.

9. The electronic horn according to claim 8, wherein the third water-proofing wall is cylindrical shaped.

10. The electronic horn according to claim 9, wherein the second water-proofing wall is cylindrical shaped.

11. The electronic horn according to claim 10, wherein the intermediate element is conical and widens in the first direction.

12. The electronic horn according to claim 11, wherein the intermediate element and the cover both have a circular outer periphery.

13. The electronic horn according to claim 12, wherein the fourth water-proofing wall is conical and widens in the first direction.

14. The electronic horn according to claim 13, wherein the first, second and fourth sound passages meander back-and-forth in the first and second directions.

15. The electronic horn according to claim 4, wherein a drain hole is defined in the intermediate element proximate to the opening of the fourth sound passage.

16. The electronic horn according to claim 4, wherein the first, second and third water-proofing walls are each cylindrical shaped.

17. The electronic horn according to claim 4, wherein the intermediate element is conical and widens in the first direction.

18. The electronic horn according to claim 17, wherein the intermediate element and the cover both have a circular outer periphery.

19. The electronic horn according to claim 4, wherein the fourth water-proofing wall is conical and widens in the first direction.

20. The electronic horn according to claim 4, wherein the first, second, third and fourth sound passages meander back-and-forth in the first and second directions.

* * * * *